United States Patent Office 3,464,805
Patented Sept. 2, 1969

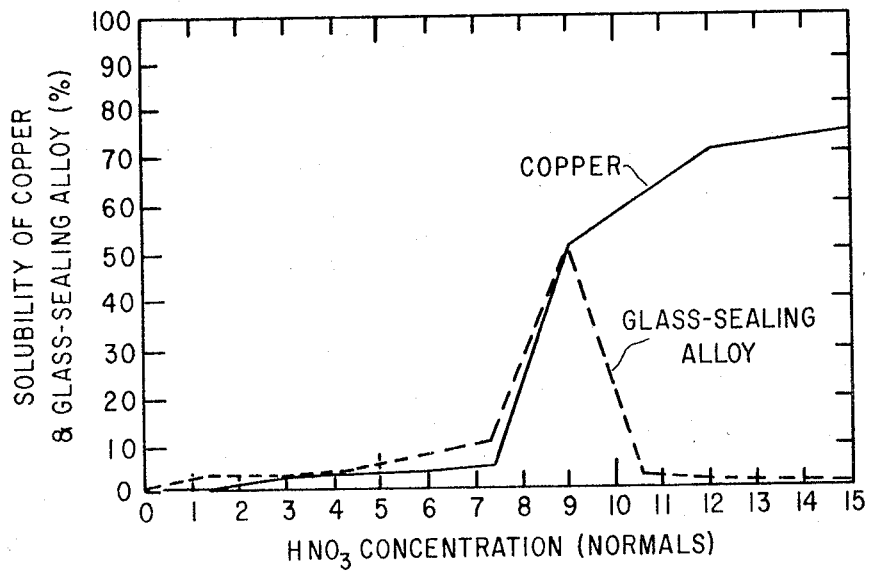
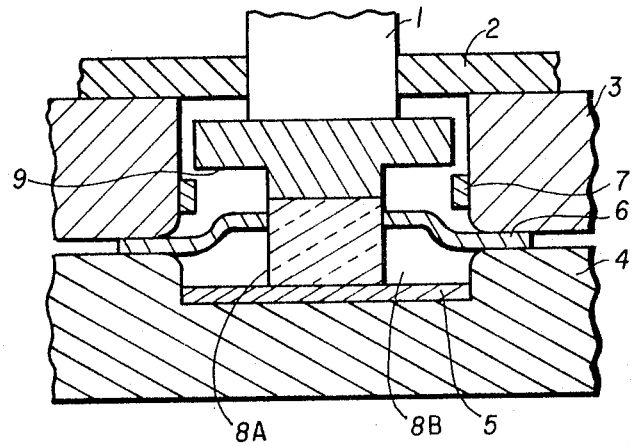
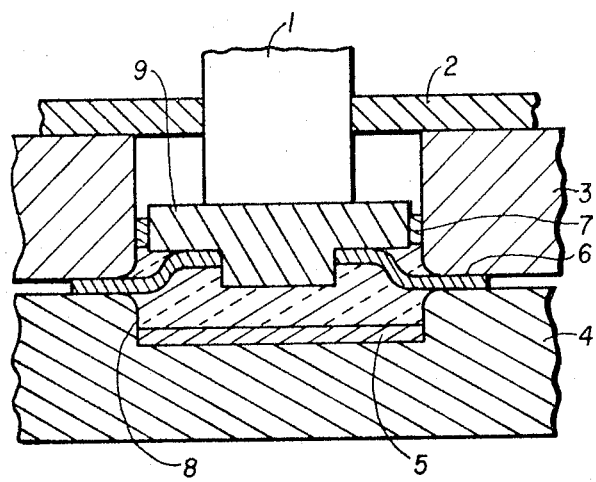
Rafael Landron, Jr
INVENTOR
BY *John J. Graham*
ATTORNEY

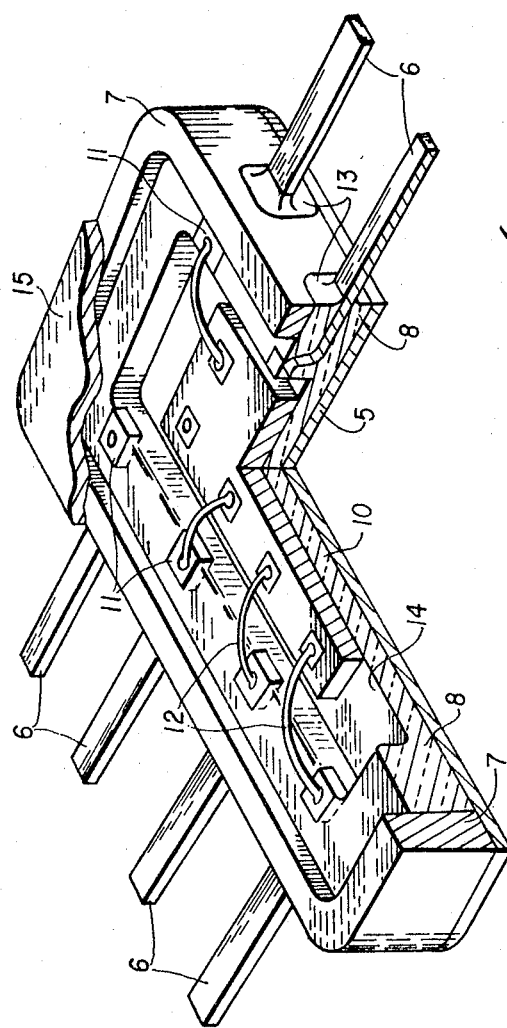

3,464,805
METHOD FOR MAKING A COMPOSITE GLASS-TO-METAL SEAL WITH ONE TRANSITORY METAL
Rafael Landron, Jr., Richardson, Tex., assignor to Texas Instruments Incorporated, Dallas, Tex., a corporation of Delaware
Filed Dec. 31, 1964, Ser. No. 422,801
Int. Cl. C03c 27/02
U.S. Cl. 65—23                                          9 Claims

ABSTRACT OF THE DISCLOSURE

Disclosed is a method for the selective dissolution of copper from an iron-nickel-cobalt glass-sealing alloy by exposing the copper and the alloy to $HNO_3$ solution.

---

This invention relates to a method of chemically separating one metal from another by the selective dissolution effect of exposing different metals to a particular concentration of acid. More specifically, it relates to the separation of a discrete quantity of copper from a glass-sealing metal alloy by exposing the two metals to a particular concentration of $HNO_3$. Even more specifically, it relates to a method for fabricating a glass-to-metal seal in a metal header, upon which header an electronic component, for example a semiconductor wafer, can be mounted.

The material most often used in packages for semiconductor devices is a metal alloy known under the trade name "Kovar." This alloy is particularly useful due to its glass-sealing properties, this being due to the fact that the alloy is wet by molten glass and has the same temperature expansion coefficient as certain hard glasses. Compositions for this alloy vary slightly, examples being 54% iron—28% nickel—18% cobalt, and 20% nickel—17% cobalt—0.2% manganese—balance iron. The material will be identified herein as an iron-nickel-cobalt glass-sealing alloy.

It has been common practice in the manufacture of some glass-to-metal seals, for example those used in the fabrication of integrated circuits, to use a weighted graphite plug to force the molten glass into the desired areas, such as around the metal leads, and also to shape the cavity to accommodate the semiconductor wafer. The graphite plug is the source of many problems, because once the glass has fused around it, the plug can only be removed by sandblasting or by some similar means. The sandblasting operation is expensive, requiring individual handling and a high degree of operator skill, since excessive sandblasting results in some of the glass being removed from the seal and causing the header to thus become defective. The graphite plug also will cause bubbles to form in the glass of some of the seals, thus causing even more of the headers to be defective.

It is therefore the principal object of the invention to provide a method of fabricating a glass-to-metal seal in an efficient and economical manner.

Another object is to provide a method of selectively removing one metal from another metal by exposing both metals to an acid solution.

Another object is to provide a method of fabricating a glass-to-metal seal which is substantially free from bubbles in the glass.

Still another object is to provide a method of fabricating a semiconductor electronic device.

Other objects, features, and advantages of the invention will become apparent from the following description of the preferred embodiment when taken in connection with the appended claims and attached drawing, wherein like numerals represent like parts, in which:

FIGURE 1 illustrates the relative solubility of copper and Kovar compared with a varying concentration of $HNO_3$.

FIGURES 2a and 2b illustrate sectional views of a header according to the preferred embodiment of the invention.

FIGURE 3 illustrates a cut-away pictorial view of a semiconductor device fabricated according to the invention.

Since a plug of some different material than graphite was deemed necessary, investigations of several materials resulted in copper being the ultimate choice for the plug. This was not immediately satisfactory, however, because a solid copper plug produces bubbles in the glass in a manner similar to that of graphite. The bubble problem was eliminated by making the plug porous, for example by the well-known powder metallurgy method, including underfiring of the plugs.

Another problem connected with the use of copper as a plug was that there was no known solvent which would dissolve the copper plug and yet not damage the glass-sealing metal alloy used for the frame of the header. An investigation of several different solvents showed that $HNO_3$ at concentrations of greater than about 10.5 N, preferably 12 N or higher, would dissolve copper without dissolving Kovar which is the glass-sealing metal alloy ordinarily used. The investigation also showed, illustrated in FIGURE 1, that a very low concentration of $HNO_3$, approximately 1.5 N or lower, would dissolve the preferred iron-nickel-cobalt glass-sealing alloy but not copper, while some intermediate point, approximately 9 N, would dissolve both the glass-sealing alloy and copper.

Another problem connected with using copper as the plug was that copper adheres quite strongly to the glass seal and also to the metal weights. This problem was overcome by immersing the plug in a liquid graphite suspension and subsequently drying it in a 250° C. oven for approximately 30 minutes. The graphite coating thus obtained was found not to cause bubbles as did solid graphite, and eliminated the adhesion problem of copper to glass and copper to the metal weights.

Because of the high thermal coefficient of expansion of copper, approximately $15 \times 10^{-6}$ cm./cm./° C., compared with glass, approximately $8 \times 10^{-6}$ cm./cm./° C., the copper contracts more than the glass and actually pulls away from it during the cooling process. Thus it was observed that some of the plugs do not require the $HNO_3$ treatment because the different thermal coefficients of expansion effect a separation of the plug from the rest of the header. For those devices which do not separate upon cooling, the $HNO_3$ bath is the next step, and as the acid works its way under the copper plug, the plug will be separated even before it is completely dissolved.

Referring now to FIGURE 2, a sectional view of the preferred embodiment built according to the invention is illustrated. FIGURE 2(A) shows the graphite fusing jig 3 and 4 clamped over the Kovar leads 6. Jig 4 has a Kovar base plate 5, upon which a portion of some sealing glass 8A, for example Corning 7052, is placed. The graphite-coated, porous copper plug 9 is then placed upon the glass. The metal weight 1 is then placed upon the copper plug 9 and is guided by the weight guide 2. The Kovar header ring frame 7 is in a position within the fusing jig to complete the glass-to-metal seal assembly once the fusion step, as illustrated in FIGURE 2(B), is effected. As further shown in FIGURE 2A, 8B represents a space to be later occupied by the glass 8A. The whole assembly, as shown in FIGURE 2A, is then placed in a fusing furnace (not shown) and heated to approximately 1000° C. FIGURE 2B illustrates how the molten glass 8 is pressed by the plug 9 and weight 1 around the leads 6 and Kovar frame 7 to complete the glass-to-metal seal. The fusing jig 3 and 4 is then removed (merely unclamped), weight 1 is lifted from the copper plug 9, and the header, which includes the glass 8, the leads 6 and the Kovar ring frame 7 is then allowed to cool, along with the plug 9. As the copper of the plug 9 contracts during cooling, it pulls away from the glass 8 in some cases. In those instances where the plug 9 does not pull away, the header and plug is then immersed in $HNO_3$ of a concentration of 12 N or higher until the acid undermines the plug enough to cause separation of the plug from the glass or until the plug is completely dissolved, whichever is desired.

Still another advantage of this method of removing the copper is that once the concentration of $HNO_3$ is at least 12 N, the solution may be used until the acid is deleted. This is contrary to expectations since it would be expected that as the acid becomes weaker, the Kovar would begin to dissolve. However, it was found that the products of the reaction between copper and $HNO_3$ somehow inhibit the reaction with Kovar. The over-all reaction between $HNO_3$ and copper is as follows:

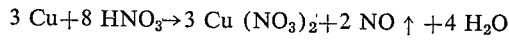
$$3\ Cu + 8\ HNO_3 \rightarrow 3\ Cu\ (NO_3)_2 + 2\ NO \uparrow + 4\ H_2O$$

This unexpected result of being able to use the acid to depletion makes the process even more economical and less complex.

Referring now to FIGURE 3, a cut-away pictorial view illustrates a completely fabricated semiconductor device. Subsequent to the copper plug 9 of FIGURE 2 being removed, it is seen that the copper plug 9 causes the glass 8 to have an indented area 14. Area 14 thus serves as a mounting surface for a semiconductor wafer 10. The electrical lead wires 12 connect contact lands on the semiconductor wafer 10 to the pads 11, the pads being the interiorly exposed portion of leads 6. Notches 13 in the metal alloy frame 7 allow leads to pass through the frame 7 and when the glass 8 is fused, the notches are filled with the glass and a glass-to-metal seal is effected between the leads 6, the glass 8 and the frame 7. It should be appreciated that the semiconductor wafer or wafers thus mounted may be any combination of N- or P-type materials and may be composed of germanium, silicon, gallium arsenide or the like and would have any number of transistors, resistors, etc., formed therein.

The frame 7 extends to the base plate 5 so that, if desired, a top plate 15 may be welded to the frame with the weld current passing vertically through the frame. Also, the plate 15 may be welded to the frame with electrodes which engage only the plate and the side of the frame so that weld current through the base plate is unnecessary.

The depression 14 in the center of the glass 8 may extend all the way to the base plate 5 so that the semiconductor wafer 10 may rest directly upon the base plate.

Although the invention has been described with reference to a specific preferred embodiment, it is understood that modifications and substitutions, such as other processes requiring either the separation of a glass-sealing metal alloy, such as Kovar, from copper or copper from such an alloy can be made without departing from this invention.

What is claimed is:
1. A method for fabricating a glass-to-metal seal, comprising the steps of positioning a plurality of lead wires and a glass-sealing metal alloy frame, placing a weighted plug of copper on a mass of sealing glass in spaced relations to the lead wires and the alloy frame, heating the glass to a temperature sufficient to fuse said glass, whereby said weighted copper plug will cause the fused glass to seal with said lead wires and said alloy frame, and subsequently exposing the copper plug and frame to a solution of $HNO_3$ of a concentration such that the copper plug will be at least partially dissolved while the alloy frame remains substantially intact.

2. The method of claim 1 wherein said copper plug is porous.

3. The method of claim 2 wherein said porous copper plug is graphite coated.

4. The method of claim 1 wherein said solution of $HNO_3$ has a concentration of at least approximately 10.5 normals.

5. The method of claim 2 wherein said solution of $HNO_3$ has a concentration of at least approximately 10.5 normals.

6. The method of claim 3 wherein said solution of $HNO_3$ has a concentration of at least approximately 10.5 normals.

7. A method for making a package for an electronic component comprising the steps of positioning a plurality of inwardly extending flat leads about and above the periphery of a flat metallic base plate, positioning a glass-sealing metal alloy ring in spaced relation to said leads, placing a mass of sealing glass at approximately the center part of the base plate, placing a substantially copper plug on said mass, placing a weight on said plug, heating the assembly to fuse said glass whereby the fused glass will flow to effect a seal between said leads, said base plate and said ring, and removing said copper plug from the assembly by subjecting the assembly to a solution of $HNO_3$ of a concentration such that the copper plug will be dissolved while the ring, leads and base plate remain substantially intact.

8. The method according to claim 7 wherein said copper plug is porous.

9. The method according to claim 8 wherein said porous copper plug is graphite coated.

References Cited
UNITED STATES PATENTS

| | | | |
|---|---|---|---|
| 1,583,464 | 5/1926 | Houskeeper | 65—23 |
| 2,084,811 | 6/1937 | Keen | 65—23 |
| 2,266,349 | 12/1941 | Wempe | 65—23 XR |
| 3,091,104 | 5/1963 | Morrill | 65—23 |

S. LEON BASHORE, Primary Examiner

FRANK W. MIGA, Assistant Examiner

U.S. Cl. X.R.

29—155.5; 65—31, 59; 156—3